United States Patent Office 2,762,713
Patented Sept. 11, 1956

2,762,713

FLINT GLASSES FOR MULTIFOCAL LENSES

Earl K. Davis, Ogden, and Murray R. Scott, Brighton, N. Y., assignors to Bausch & Lomb Optical Company, Rochester, N. Y., a corporation of New York No Drawing. Application December 3, 1953, Serial No. 396,062

5 Claims. (Cl. 106—53)

This invention relates to optical glass compositions and more particularly it has reference to compositions of flint glasses which are adapted to be used as one of the elements in fused multifocal lens manufacture.

Flint glasses, having an index of refraction for the D line ($n_D$) between 1.617 and 1.690, have been developed and used by lens manufacturers for many years. In the manufacture of optical flint and barium flint glasses it has for many years been customary to add $Al_2O_3$, $ZrO_2$ and $TiO_2$ to the glass composition to obtain greater durability. Alkali metal oxides have been added to improve the fusion properties and to increase the expansion coefficient. PbO and BaO have been used to obtain the required high index of refraction. These flint and barium flint glasses are generally formed into small bifocal segments which are fused onto larger discs of conventional crown glass for producing multifocal ophthalmic lenses. The flint glass and crown glasses are closely controlled in composition by small variations in the amounts of the alkali oxides for regulating the expansion behavior of the glasses between 0° and 450° C., so as to obtain strains of less than ±200 millimicrons per cm. when test pieces in the shape of parallelepipeds 2"x½"x½" are fused and cooled to room temperature at a rate of about 200° F. per hour.

Heretofore, defects in the form of bubbles and minute crystals have been formed frequently at the fused interfaces between the flint glass and the crown glass. The aforementioned defects cause a high percentage of rejections of finished multifocal lens blanks with a resulting higher unit cost to the ultimate consumer.

Accordingly, the present invention seeks to provide improved flint glasses which by a change in composition involve, among other things, an increase in the viscosity of the conventional flint glasses to produce new flint glasses which are adapted to fuse with conventional crown glasses with a substantial reduction in defects at the fused interfaces.

Glasses embodying our invention comprise, by weight, the following: 33%–44% $SiO_2$, at least one alkali metal oxide from the group consisting of $K_2O$ and $Na_2O$, the total alkali metal oxide being between 4.5% and 10.5%, 37% to 51% PbO, 0.5% to 6.0% BaO, 0.5% to 5.0% ZnO, and 0.2% to 1.0% of a fining agent selected from the group consisting of $As_2O_3$ and $Sb_2O_3$, the remainder of the composition comprising compatible oxides selected from the group consisting of 0% to 3% $TiO_2$, 0% to 1% $Ta_2O_5$ and 0% to 4% $Al_2O_3$. The final composition may include all, none or any combination of the aforementioned compatible oxides. The refractive indices for the D line ($n_D$) for our glass composition have a range of 1.61 to 1.69.

The essential ingredients of the improved flint glasses, namely, $SiO_2$, alkali metal oxide, and PbO, BaO, and ZnO should be held within the above indicated proportions to obtain a substantially bubble-free interface between the fused new flint glass and conventional crown glass.

The replacement of a portion of the $SiO_2$ by the ZnO involves the use of less PbO than in conventional flint glasses of the same index of refraction. Some BaO, usually absent in flint glasses, is introduced in the composition to adjust the index of refraction and to reduce the bubble defects at the interfaces of the fused flint glasses and the crown glasses. The alkali metal oxide range must be rigidly controlled to maintain the required strain values.

For illustrating but not limiting the invention, the following examples of glass compositions are given in percent by weight:

|  | I | II | III |
|---|---|---|---|
| $SiO_2$ | 44 | 42.6 | 35 |
| $K_2O$ | 10 | 6.5 | 7 |
| $Na_2O$ | | 3.5 | |
| PbO | 37.2 | 39.2 | 44 |
| BaO | 4.3 | 1.0 | 5.5 |
| ZnO | 4.3 | 3.0 | 4.5 |
| $TiO_2$ | | 2.0 | 2.5 |
| $Ta_2O_5$ | | | |
| $Al_2O_3$ | | 2.0 | 0.5 |
| $As_2O_3$ | | 0.2 | |
| $Sb_2O_3$ | 0.2 | | 1.0 |
| $n_D$ | 1.61 | 1.61 | 1.69 |

We claim:
1. An optical glass composition comprising by weight 33% to 44% of $SiO_2$, at least one alkali metal oxide from the group consisting of $K_2O$ and $Na_2O$, the total alkali metal oxide being between 4.5% and 10.5%, 37% to 51% PbO, 0.5% to 6.0% BaO, and 0.5% to 5.0% ZnO, the remainder of the composition comprising compatible oxides.

2. An optical glass composition comprising essentially 33% to 44% $SiO_2$, 4.5% to 10.5% total alkali metal oxides comprising at least one of the group consisting of $K_2O$ and $Na_2O$, 37% to 51% PbO, 0.5% to 6.0% BaO, 0.5% to 5.0% ZnO, and 0.2% to 1.0% of a material selected from the group consisting of $As_2O_3$ and $Sb_2O_3$, the remainder of the composition comprising compatible oxides and the index of refraction ($n_D$) of the glass being 1.61 to 1.69.

3. An optical glass composition consisting approximately of 35% $SiO_2$, 7% $K_2O$, 44% PbO, 5.5% BaO, 4.5% ZnO, 2.5% $TiO_2$, 0.5% $Al_2O_3$, and 1.0% $Sb_2O_3$.

4. An optical glass composition consisting approximately of 44% $SiO_2$, 10% $K_2O$, 37.2% PbO, 4.3% BaO, 4.3% ZnO and 0.2% $Sb_2O_3$.

5. An optical glass composition consisting approximately of 42.6% $SiO_2$, 6.5% $K_2O$, 3.5% $Na_2O$, 39.2% PbO, 1% BaO, 3% ZnO, 2% $TiO_2$, 2% $Al_2O_3$, and 0.2% $As_2O_3$.

References Cited in the file of this patent

UNITED STATES PATENTS 1,943,051    Berger _____ Jan. 9, 1934

FOREIGN PATENTS 408,993    Great Britain _____(1934)

OTHER REFERENCES

Eitel et al.: Glastechnische Tabellen (1932), pp. 316 and 677.